April 2, 1963 P. J. RIEPPEL ET AL 3,084,246
PROCESS AND APPARATUS FOR WELDING
Filed July 6, 1959 6 Sheets-Sheet 1

Perry J. Rieppel, Glenn E. Faulkner, INVENTORS
Jerome W. Nelson & Harry C. Cook
SMALL, THOMAS, DUNHAM & MARX
BY /s/ E. M. Thomas  ATTORNEY April 2, 1963 P. J. RIEPPEL ET AL 3,084,246
PROCESS AND APPARATUS FOR WELDING
Filed July 6, 1959 6 Sheets-Sheet 2

Perry J. Rieppel, Glenn E. Faulkner, Jerome W. Nelson & Harry C. Cook   INVENTORS
SMALL, THOMAS, DUNHAM & MARX
BY
ATTORNEY Perry J. Rieppel, Glenn E. Faulkner, Jerome W. Nelson & Harry C. Cook   INVENTORS

SMALL, THOMAS, DUNHAM & MARX

BY   ATTORNEY

April 2, 1963 P. J. RIEPPEL ET AL 3,084,246
PROCESS AND APPARATUS FOR WELDING
Filed July 6, 1959 6 Sheets-Sheet 6

Perry J. Rieppel, Glenn E. Faulkner,
Jerome W. Nelson, & Harry C. Cook   INVENTORS
SMALL, THOMAS, DUNHAM & MARX
BY E. M. Thomas                     ATTORNEY United States Patent Office 3,084,246
Patented Apr. 2, 1963

3,084,246
PROCESS AND APPARATUS FOR WELDING
Perry J. Rieppel, Worthington, and Glenn E. Faulkner and Jerome W. Nelson, Columbus, Ohio, and Harry C. Cook, Orange, N.J., assignors, by direct and mesne assignments, to Esso Research and Engineering Company, Linden, N.J., a corporation of Delaware
Filed July 6, 1959, Ser. No. 825,159
25 Claims. (Cl. 219—125)

The present invention relates to a process of welding and also to apparatus for carrying out such a process. It relates more specifically to an automatic process for making circumferential welds, particularly in pipe lines and analogous structures. In its broader aspects, however, the process has application to other types of welding, especially out-of-position welding, and in some of its aspects it can be used, by way of example, for joining the edges of flat or curved plates to form butt joints in various positions. In its apparatus aspects, the invention concerns high speed welding equipment which is largely automatic or at least semi-automatic for performing relatively continuous welding and a series of related functions adapted to insure uniform welds of high quality and strength.

As one of their more important applications the process and apparatus will be described especially with reference to welding joints in steel pipe, such as is used in pipelines for transmission of natural gas and petroleum products. The invention, of course, has other applications as well.

In the prior art, various suggestions have been made for automatic or semi-automatic welding of butt joints in pipes and other structures. Generally speaking, however, the prior proposed automatic apparatus and methods are too slow and have not been satisfactory, or have at least required considerable manual work or large cumbersome auxiliary equipment to supplement the machine welding. As a general rule pipe lines have been welded by abutting the pipe ends, previously machined to a bevel which forms a groove to be filled with welding material. This is usually done by clamping the joint internally or externally to hold the pipe sections in proper abutting relation for the welding operation, and applying the welding material by means of a manually controlled electric arc. The weld metal in the prior art process is applied in small increments to fill the V-groove of about 60° to 75° angle, this angle being determined when the pipe ends are machined prior to assembly in the pipe line. This type of welding has usually been accomplished first by tacking with small pools or globules of molten weld metal and is then carried on piece-meal in a series of manual operations. It requires considerable operative skill as well as much time and material to do an acceptable job. Some of the welds made by present methods tend to be rough and uneven in appearance, and may contain cavities, flaws and other faults.

Primary objects of the present invention are to provide a method for making welds rapidly, especially welds in large pipes which cannot be rotated, by forming carefully controlled uniformly sized gaps or spaces between the parts to be welded and then filling these gaps. Another object is to fill the welds evenly in a single pass operation. Another is to achieve a high degree of uniformity in weld quality and strength and to control flow of the molten metal and also to prevent deformation of the joint due to shrinking and other forces as the welding is being accomplished.

A more specific object is to provide in a single apparatus means for rapid overland pipe line welding in the field. This includes means for forming a carefully controlled gap or space between the abutting portions or sections to be welded together, keeping proper alignment between the joint elements and the welding head. Another object is to feed welding material at a controlled and uniform rate during continuous traverse of the welding head and in a carefully controlled speed relation thereto.

Further specific objects are the following, although the invention is not limited thereto, as indicated above:

A. To make satisfactory single-pass welds especially in plate and pipe of ¼ to ⅜ inch thickness in all positions, e.g. in pipe-welding to weld uniformly in single pass at the top, sides and bottom of a non-rotated pipe.

B. To weld an unusually narrow joint, usually in single pass operation, where the actual joint or gap depth to width ratio is from about 3 to 7:1 (preferably 4.5 to 6.5:1), and where the fusion zone depth to width ratio is of the general range of 2 to 1 or more.

C. To form welds of unusual but highly desirable fusion line geometry, especially for single-pass welds. In the present invention, using a continuously fed welding wire, the fusion zone narrows under the wire burn-off position but flares out at the root due to superheated metal under the arc, thus melting back the root edges; this insures good root fusion.

D. To weld steel plate and/or pipe especially in the ¼ to ⅜ inch thickness range, in any position and in a single pass and at a high linear speed, without requiring a backing at the root of the joint.

E. To accomplish efficient and economical welding by a unique welding action obtained by the proper combination of welding variables (traverse rate, weld wire feed, gap width, electric potential and current, etc.) in a well controlled and substantially automatic process.

F. To use a continuous arc, with relatively very little fluctuation in amperage, while making complete welds in all positions as required in welding non-rotatable pipe.

G. To form welds having an unusual texture and high strength by essentially single pass operation in a deep, narrow, vertical, walled gap.

Still more specific objects will appear from a detailed description of the process and apparatus which follow.

The process, and with suitable modifications the apparatus, may be used for straight or flat welds of abutting members, e.g. joints or seams in flat and curved plates as well as welding together the ends of adjoining pipe sections. Flat or curved plates and sheets may be welded in various positions and from various directions, vertical, horizontal, overhead, or otherwise. With suitable variations such as selected shielding gases and appropriate fluxes, etc., known to those skilled in the art, the basic process may be used also for welding metals other than steel.

In welding circumferentially around horizontal pipes in fixed or relatively fixed position such as are usually placed in pipelines, where the pipe cannot be rotated but the weld must be formed around it, special problems are encountered in controlling the flow of molten metal. At the top especially in conventional welds, the metal tends to flow to the root of the weld at the inside of the pipe leaving beads, burn-throughs and other intrusions inside. In welding "out of position," i.e. in positions other than the flat, e.g. at the sides of pipe lines, the molten weld metal tends to flow around the pipe rather than into the joint. At the bottom of such a pipeline molten metal tends to flow down and out of the joint rather than into it. The effect of gravity on the molten weld metal is one of the problems but the thermal and convective effects of the arc and the gases surrounding it also are important. The force of the arc itself (involving perhaps ionized gases or vaporized metal flowing from the heat source) is another factor to be reckoned with.

Conventional girth welds in steel pipe which are made in several passes, are often made in successive waves or stages, e.g. one, two, or three welders may make a "first pass," merely spot welding or partially welding the pipe joint in abutting relationship by forming a thin bond around the joint. Subsequently, other welders make a "second pass," filling in the joint substantially. Finally other "finish" welders complete the weld by adding enough filler metal to fill the joint and provide a flush or slightly convex weld bead. This practice is commonly followed in order that the construction of the pipe line can proceed across country rapidly, consistent with the ability of the pipe handlers, trenchers, benders, etc., to string it out. The demand for mileage production in pipe lining has militated against the success of prior art automatic welding processes because of their lack of flexibility and their lack of adaptability to rapid setting up and shifting.

The welding process of the present invention has the important advantage of wide flexibility. It makes it possible, with reasonable amounts of equipment, to prepare high quality girth welds at rates which can keep up with high speed pipe laying practices in the field and at substantially reduced cost. Welds of adequate tensile strength and ductility, equivalent to or greater than that of the basic pipe metals, can be made consistently. Human variables are largely eliminated, giving superior weld quality and uniformity; smaller amounts of welding rod or wire are consumed and the process can be more easily protected from variations in weather and other ambient conditions than prior art methods.

Referring now to the drawings.

Figure 9:
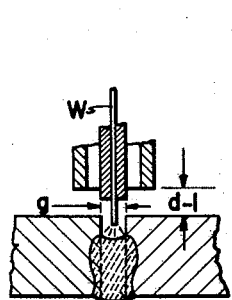
Figure 10:
Figure 11:
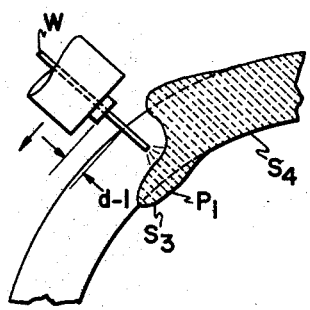

FIGS. 9, 10, and 11 are small detailed sectional sketches showing important details or critical dimensional relationships in welds of the type under consideration.

Figure 12:
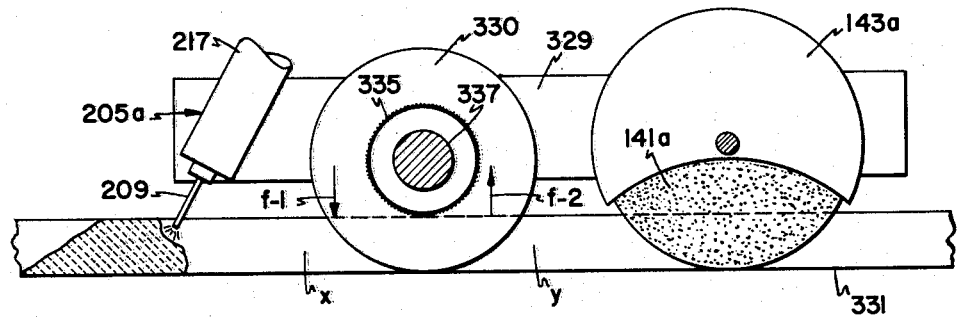

FIG. 12 shows a continuous welding layout wherein a butt join between abutting rectilinear elements is grooved to uniform spacing and followed immediately by welding while deformation is prevented by a spacing device between the grooving unit and the welder.

FIGS. 13, 14, 15, and 16 show diagrammatically specific aspects and modifications of the subject welding process applied to circumferential or girth welds.

Figure 17:

FIG. 17 is a detailed fragmentary sectional view of a finished weld typical of those made by the present invention.

Figure 1:
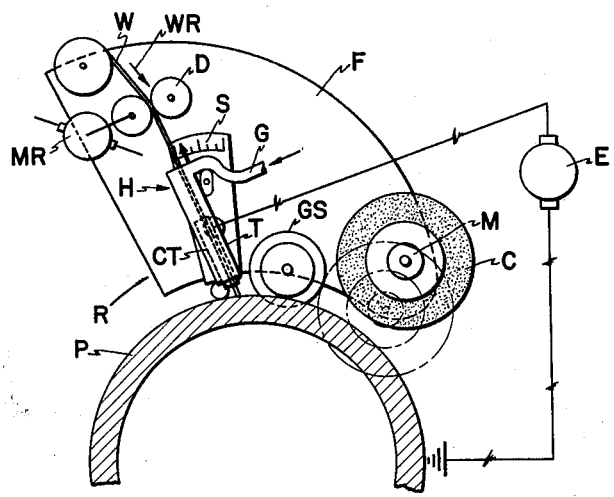
FIG. 1 is a diagrammatic view showing the process as applied to pipe line welding.

Referring now to FIG. 1, an important aspect of the invention is the interrelated control of the key operating variables. Consider a pipeline P in which a butt joint is to be welded. The following controls must be established:

A. The position with respect to each other of the pipe sections which are to be joined by a weld.

B. The position of the apparatus, especially the welding head H with respect to the joint.

C. The rate R of traverse of the head along the joint (or pipe circumference).

D. The rate WR of feeding welding rod or wire W and particularly the relationship between R and WR.

E. The spacing of the contact tube CT end from the pipe or work surface. This distance, hereinafter called contact-tube-to-work distance or CTWD requires careful and specific control as hereinafter explained.

F. Control over the weld gap against forces exerted when the hot metal cools and tends to shrink, thus changing the weld gap width, etc.

G. Control over applied electromotive force or voltage E applied to the arc. For continuous single pass welding this is a critical factor.

H. Control over flow of the molten metal pool, especially at various positions around the joint where the effect of gravity differs widely.

I. Control of the penetration of the arc and certain other characteristics thereof by means of a shielding or modifying gas which surrounds the welding operation, to achieve optimum results.

The process is applicable to steel plate (or pipe wall) thickness of 0.125 to 0.500 inch, but is best applied to material having a thickness between 0.250 and 0.375 inch. It is particularly applicable to steel pipe having up to 0.40% carbon, preferably about 0.25% carbon, e.g. a steel such as A53–GRB. The pipe joint is preferably a perpendicular butt joint (see FIG. 3, FIG. 9, FIG. 10) having a relatively deep and narrow gap $g$. The width of gap $g$ is between about 0.020 and 0.100 inch, preferably between 0.040 and 0.070 inch and the depth to width ratio is always greater than 2. Hence the usual depth to width ratio, for material of 0.280 inch thickness is between about 4 and 7, preferably between 4.5 and 6.5. A gap width of about 0.060 inch is very satisfactory for this material. It should be held uniform within narrow limits for best results, e.g. within plus or minus .003″— preferably between ±.0015″. The latter tolerance limits are very often strictly applicable.

The CTWD may have extreme limits between 0.10 and 1.50 inches, but is usually to be kept between 0.300 and 0.500 inch. For standard steel pipe of about ¼ inch thickness, a desirable CTWD is 0.475″±.010″.

The applied voltage, from a source such as generator E, FIG. 1, may be between 20 and 35 volts under most favorable conditions. The preferred range is between about 25 and 30 volts, desirably with close regulation; i.e. within about ±1 volt. A specifically preferred operation uses a voltage of 27.5, ±0.3 volts.

The welding wire must be narrower than the gap and must be fed with such accuracy that it touches neither side of the gap, at least until penetrated well within the gap. Broadly speaking, wire having a diameter as low as 0.010″ or as great as 0.125″ is usable but narrower limits of 0.030″ to 0.062″ are preferred. For a joint gap width of about 0.060″, a wire of about 0.040″ diameter is very satisfactory.

The wire may be fed perpendicularly with respect to the work (i.e. radially in the case of pipe welding) but is preferably varied somewhat from this angle by tilting the contact tube CT about an axis to an angle away from the radial or vertical indicated by a pointer and scale S, FIG. 1. This angle may be as much as +30° (wire leans ahead of the welding) or as much as −45° (wire lagging behind the welding as shown in FIG. 1). However, the presently preferred angle for common types of pipe is between +15 and −30°. Particularly good results have been obtained on 0.280″ wall thickness pipe with an angle of about −12° but the optimum angle differs as pipe thickness and other variables change.

The extent to which the arc penetrates into a narrow gap has been found to vary greatly. It depends in part upon the character of the atmosphere or gas which surrounds the arc. For good penetration, an atmosphere of carbon dioxide is preferred and is supplied from a suitable source through tube G to the shield T which surrounds the electrical contact tube CT. The gas flow rate is not particularly critical. For a welding head traverse speed of 35 to 55 inches per minute, welding a 0.060" gap in standard pipe of 0.280" wall thickness, a gas flow of about 30 cubic feet per hour is adequate. Other gases may be used, such as helium or argon, or mixtures of either of these with carbon dioxide. Plain carbon dioxide is usually preferred because it is cheap and effective.

The electrical current of course varies with the applied voltage, the wire diameter, the CTWD, the shielding gas, etc., but it usually will be between 200 and 400 amperes. Broader limits of 100 to 600 amperes may be tolerated. In closely controlled specific operations of the type mentioned above, the current usually runs between 300 and 310 amperes during the steady weld run.

The control of gap width between pipe ends which have been carefully machined may be accomplished, at least in theory, by very accurate alignment and spacing of the pipe sections, provided they are very firmly clamped in place. In practice this has been found so difficult that it is preferable to set the pipe sections in abutting position and then cut the gap to the exact width desired. A cutting wheel C is mounted on the traveling frame F for this purpose. It is preferably an abrasive disc of the desired gap width in thickness but other cutting devices may be substituted. It is provided with its own motor M and can be moved more or less radially into and out of cutting position as indicated by the dotted lines, FIG. 1.

With the pipe sections clamped (by clamping means not shown in FIG. 1) in abutting relationship, the movable frame F is traversed clockwise and the gap forming device C cuts a gap of the precise width desired. The welding head H follows and the welding arc is struck, wire W being fed by drive rolls D which are driven by a well regulated motor MR at wire feed rate WR. For a welding head traverse rate of 35 to 55 inches per minute, in 0.280" pipe, with a gap of 0.060" width and using 0.040" wire, the wire feed rate should be between 400 and 700 inches per minute. Too slow a wire feed rate causes lack of penetration and poor root fusion. "Cold shuts" (typical of certain other processes) may result. Too fast a wire feed rate gives excessive penetration (and sometimes burn through). The wire must be fed at such a rate that the arc penetrates deeply enough to fuse in and properly weld at the root, but not so as to burn through to the inside of the pipe. Roughly speaking, for welds in this kind of pipe, wire feed speed is about 5 to 20 times the weld traverse rate (and the latter is preferably at least about 30 inches per minute) but the wire feed speed varies with wire diameter, spacing, etc. In any case, uniformity of wire feed rate is important and, as a rule, it should be kept within narrow tolerance, e.g. about ±1%. Applied voltage goes through a transient stage at the start but should settle down within ±.3 volt for any given setting.

When the welding operation follows immediately behind the cutter wheel C, the shrinkage of metal as it cools tends to pull the pipe sections together reducing the gap width. Since an abrasive cutting wheel forms a gap very little wider than the wheel thickness, shrinkage of the solidifying weld will pinch the cutter and cause it to break unless gap width is purposely maintained. Hence gap spacing wheel GS is provided, with a rim portion of the right thickness to hold the gap open to the required width and thus protect the cutter or gap forming device C.

Now referring to FIGS. 2 and 3, two other important aspects of this invention will be explained.

The welding head H is preferably mounted on a pivot 1 on a support plate 2 which is slotted at 2S and mounted on pins 3 fixed in the main movable frame F for vertical (or radial, in the case of pipe welding) movement with respect to the work on pipe P. A spring $S_2$ tends to pull the head H towards the work P but a roller 4 on plate 2 rides on the surface of the work and holds the head (and consequently CTWD) at the desired spacing. Roller 4 can be adjusted to vary the spacing as desired.

Figure 3:
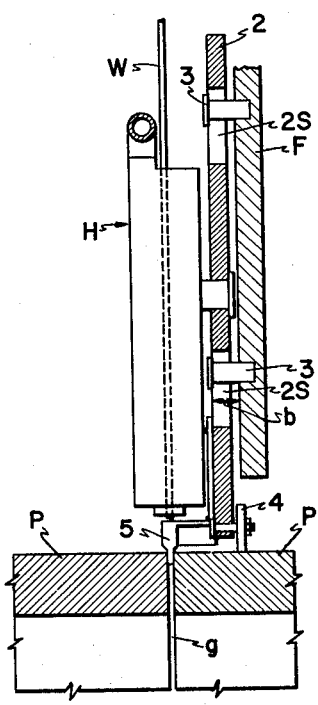
FIG. 3 is a side view of the apparatus of FIG. 2, with certain parts shown in section and other parts omitted for the sake of clarity.

Also, in order to feed the wire accurately to the center of gap $g$, FIG. 3, a guide blade 5 is pivoted at the left and a similar blade 5a at the right, by pivot pins 6 and 6a respectively mounted in plate 2. The blades are each equipped with a spring 7 or 7a which tends to hold the blade in gap $g$, unless the blade is latched in the inoperative position (see 5a) by a latch 8 or 8a. Plate 2 is permitted to move laterally (see arrow $b$ FIG. 3) because space for such movement is permitted on pins 3. By this means, the blade 5 ahead of the wire W, depending on the direction head traverse movement, insures the carefully centered wire feed into the gap.

With the foregoing explanation, specific apparatus embodiments will next be described.

Figure 4:
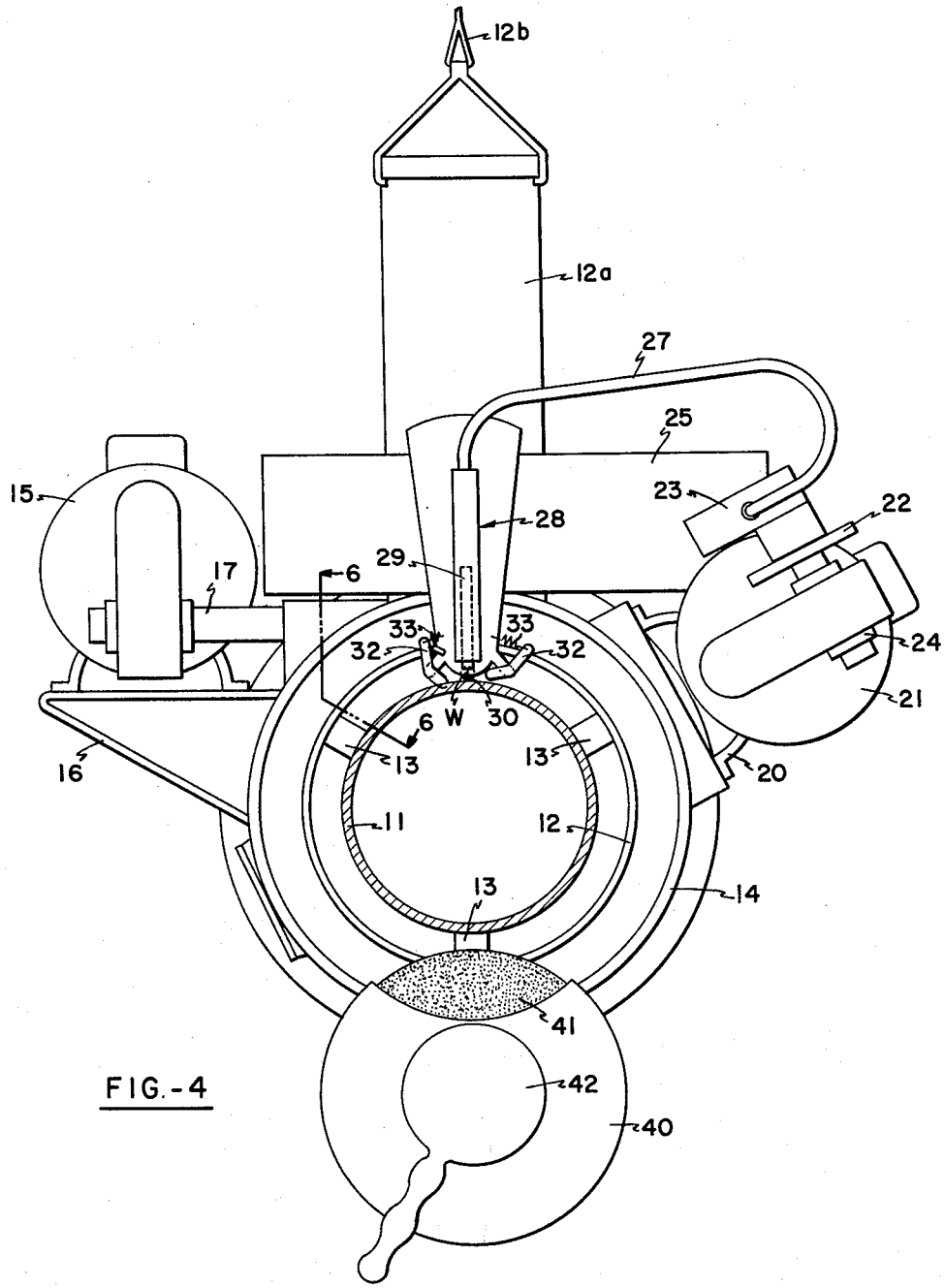
FIG. 4 is a vertical elevational view, taken transversely to a pipe line, of a preferred form of welding apparatus made according to the present invention.
Figure 5:
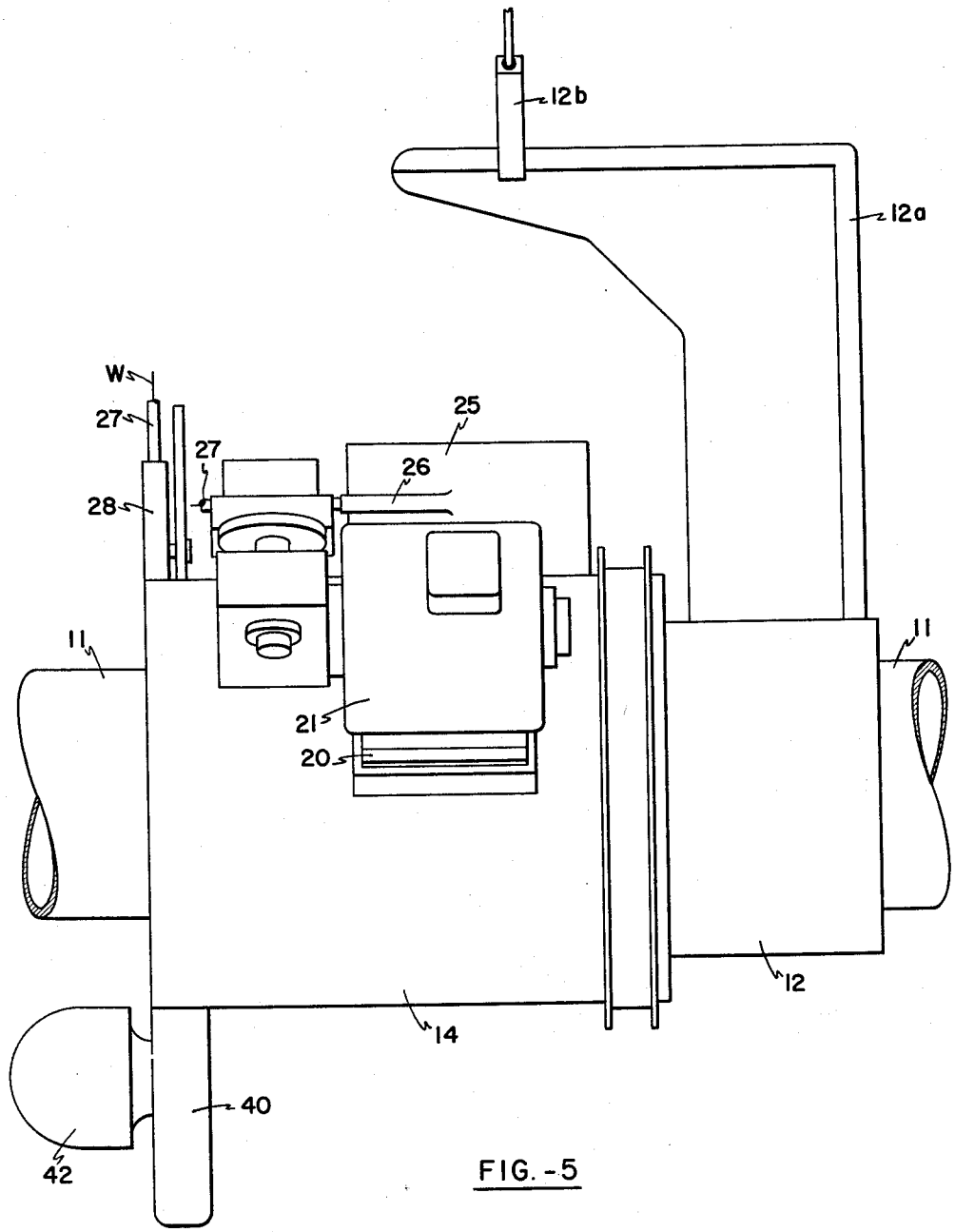
FIG. 5 is a side view of the apapratus of FIG. 4.
Figure 7:
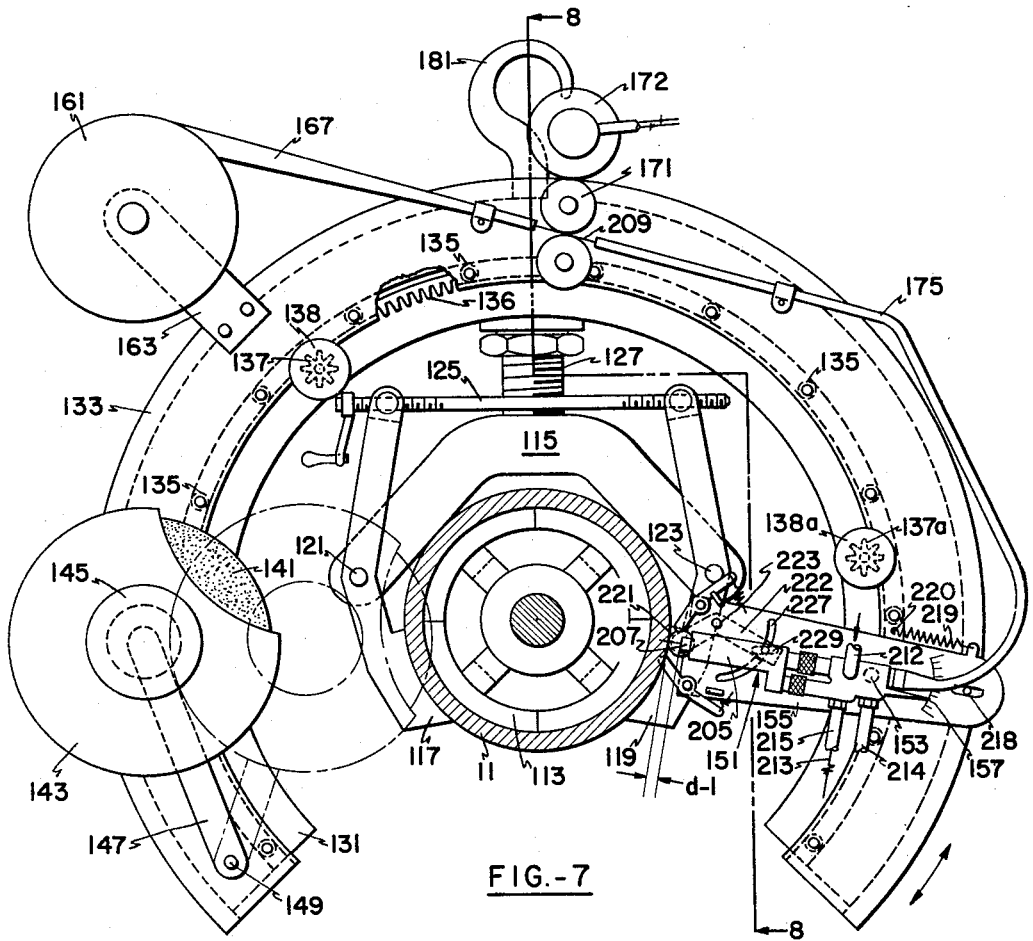
FIG. 7 is a front elevational view, also taken transversely to a pipe line of another modification.

In FIGS. 4, 5 and 7, a pipe line 11 is shown, on which there may be set the apparatus of the preferred form. This comprises an annular base or main frame 12 adapted to be mounted concentrically on the pipe by a plurality of line-up bars 13. These are preferably in the form of relatively slideable wedge pairs of well known type. Relative movement between the two parts, all the wedge pairs being operated simultaneously and to the same degree, effectively centers the apparatus around the pipe and clamps it in place. The operating means are not shown as they are of conventional and well known type.

Frame 12 is provided with a strong overhead arm 12a which has a lifting link 12b for engagement by a suitable lift device such as a tractor crane.

Frame 12, when in use, is locked to the pipeline in a stationary position. It is also provided with suitable annular bearings and gear means to support, and drive when required, a rotatable annular frame 14. This frame 14 is provided with a reversible motor 15 suitably mounted on a bracket 16. Through suitable gears the motor 15 drives a worm shaft 17 which carries worm 18 engaging an annular gear 19 fixed to stationary frame 12. See FIG. 6. Operation of motor 15 drives the frame 14 and all the apparatus mounted thereon, including motor 15 itself, around the frame 12 in either direction, as desired. Bearings 19a support frame 14 on frame 12 for free rotation.

On another bracket 20 secured to frame 14 there is mounted a wire drive motor 21 capable of close speed regulation with respect to traverse drive motor 15. This motor is provided with a quick acting electrically controlled clutch 22 of conventional type through which, when clutch 22 is engaged, wire feed means 23 may be operated. A solenoid 24 operates clutch 22 when energized. A welding wire supply spool or reel 25 is mounted on frame 14 and has an outlet guide 26 (FIG. 5) through which welding wire is guided to the wire feed means 23. A further guide tube 27 leads the wire to an arc welding head 28 which is essentially similar to the head H of FIGS. 2 and 3.

The welding head 28, is of a known type, comprising preferably a cooling circuit, a gas supply for assistance in control of the arc, and the usual electrical connections. It is mounted in a floating support with respect to the work so that it can move radially towards and from the pipe surface and also longitudinally along the pipe. This is done for reasons already described. By means of the rider, shown as adjustable roller 30, the floating head 28 remains at a controlled distance from the outer surface of pipe 11, despite irregularities in such surface.

Also, by means of alternatively selectable feeler guides 32, which drop into the relatively narrow gap or groove between the pipe ends, the welding head is constantly guided so that the wire W emerging from the contact tube 29 feeds into the middle of the gap as welding takes place. A spring 33 biases the guide 32 into the groove or gap when it is unlatched into guiding position. At other times as described above in FIG. 2, the guides or feelers 32 may be latched up out of place, e.g. when the frame 12 is slid along the pipeline towards the next joint to be welded.

In addition to the welding head and the wire feed means, etc., the rotary frame 14 supports a gap cutting unit 40. The latter is mounted for radial movement towards and away from the pipe. When not in use it is held in an outward position where it is seen in FIG. 1. The cutting device comprises a cutting wheel 41, preferably a thin abrasive wheel, although a saw of suitable cutting material may be used. It is driven by a motor 42, preferably an air motor because high energy input is required for rapid cutting, but any suitable drive motor can be used.

Figure 6:
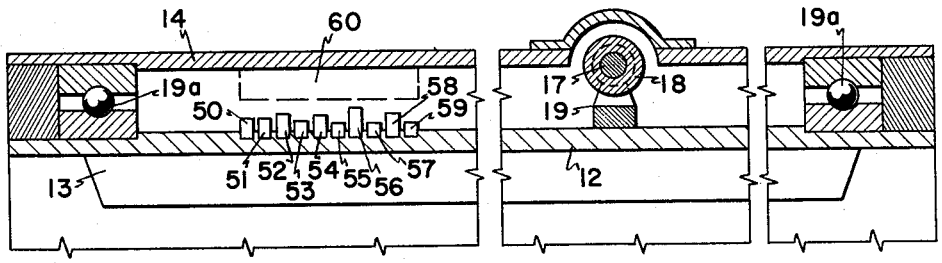
FIG. 6 is a sectional detail taken substantially along the line 6—6 of FIG. 4 showing certain control elements.

The precise timing of the various phases of the welding operation is an important aspect of this invention. As shown in FIG. 6, a series of cams, 50, 51, 52, etc., to 59, is mounted on frame member 12 to control various functions.

Switches are mounted in area 60 on frame 14 so as to engage the cams 50 to 59, respectively in a suitable order. Since the switches and their manner of operation are all conventional they will not be described in detail but will only be exemplified by the explanation of the wire drive.

Supposing that the equipment were to be set into operation by starting motor 15 using a manual switch which is not shown, motor 15 drives the worm 18 causing frame 14 to move with respect to frame 12. A switch engages cam 50 to start the wire feed motor 21. This motor has mechanical inertia and does not reach full speed instantly, hence clutch 22 is not actuated until later e.g. when the head has reached weld starting position so that the wire feed will start off at maximum acceleration; i.e. essentially the desired operating speed. Meanwhile the arc current to the welding head has been turned on; the gas and water flows have been started and the wire-feed clutch is energized.

On reversing, to weld counter-clockwise instead of clockwise for example, others of the switches are operated in the same manner to give the proper sequence.

Referring back to FIG. 4, the cutting wheel 41 can be moved into position to cut ahead of the welding operation, both proceeding at the same time. Ordinarily, however, it is preferred to cut, say, the left half of the circumference and weld immediately following, then to reverse the apparatus, cut the right half of the circumference and weld that to complete the job. Certain advantages in this type of operation are described below.

Turning now to FIGURE 7, there is shown a piece of steel pipe 11 fitted against an earlier piece 201 (FIG. 8), the pieces being equipped with an internally expanding mandrel or clamp 113 which is intended to hold two abutting pipe ends in proper alignment for welding. The apparatus comprises a saddle unit 115 which serves as a main support by resting on the pipe as a base. The saddle is provided with a pair of opposed clamping arms 117, 119, pivotally mounted at 121 and 123 respectively. Means for actuating the clamping arms to secure saddle 115 to the pipe 201 are indicated at 125 but these means can be varied or replaced by other known clamping devices as desired. The unit is thus firmly supported on the pipe so that it does not rotate or slide with respect to the pipe. These parts must be rather accurately formed and assembled so that the welding apparatus is seated properly at right angles to the pipe axis.

Figure 8:
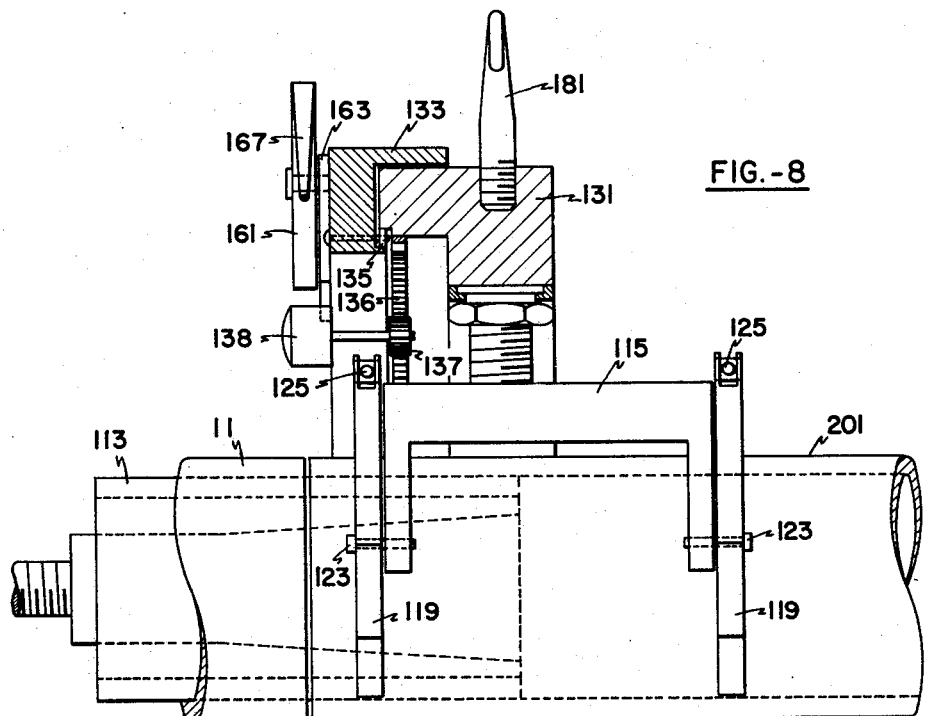
FIG. 8 is a transverse elevational view, partly in section, taken substantially along the line 8—8 of FIG. 7.

A suitably heavy vertical screw 127 projects upwardly from saddle 115 to support rigidly and in vertically adjustable manner an arcuate frame member 131. This member 131 is circular in form except for a cut-out section of sufficient extent to clear the pipe. It supports and forms a guiding track for a ring mounting 133 of similar open circle design supported on suitable anti-friction bearings 135 as indicated in FIGURE 8. The member 131, although in the form of an open ring, is provided with a gear or rack 136 engaged by a pair of pinions 137, 137a, in turn driven by motors of good regulation characteristics as indicated at 138, 138a. The motors are arranged on rotatable member 133, at positions more or less diametrically opposite each other, so that at any position the member 133 can be traversed concentrically and continuously about the pipe 11 so as to carry various operating tools around the pipe to any desired position. In this sense the member 133 may be considered a tool-carrying turret. It carries the following tools: a high speed power driven abrasive cutting disc 141 provided with a suitable shield 143. This is equipped with a driving motor 145, which may be either electrical or pneumatic, as desired. The whole assembly is pivotally mounted, by means of a swinging arm 147, at a supporting post or stud 149 on the ring or turret 133. It can be swung inwardly to a cutting position, indicated in dotted lines, or outwardly to the inoperative position shown in full lines, as desired. The turret carries, more or less diametrically opposite the cutting disc, a welding head 151 pivotally mounted at 153 on a slidable plate 155 which is mounted on ring 133 for radial sliding movement and movement along the pipeline axis in a manner similar to that of FIGURES 2 and 3. The arrangement for pivotal mounting is such that the angle of the welding head with respect to the work surface can be varied as indicated by a pointer and scale 157 for purposes already described. The sliding plate can be pulled away from the work against the force of spring 219 to an inoperative position where it can be latched as desired, e.g. if it is desired to cut without welding. A suitable latch, not shown, is provided, as will be obvious.

Turret 133 also carries a welding wire reel 161 suitably mounted on a fixed arm 163. Wire 209 from the reel 161 is guided through a tubular conduit 167 to wire feeding mechanism 171 consisting of a pair of rollers suitably power driven by a motor 172 of closely controllable speed characteristics. The wire beyond the rollers passes through a further guide tube 175 to the welding head 151 where it is guided to the point where it is to be used in welding.

The whole assembly so far described is provided with a lifting ring or hook 181 rigidly secured to the stationary frame 131 so that the apparatus can be lifted by suitable mechanical means onto and off the pipe line.

Referring to FIGURE 8, the new section of pipe 11 is shown abutted quite firmly against the previous pipe section 201, the two being clamped together internally and in proper alignment by the expanding mandrel 113 previously described. For the present process it is preferred that the ends of the pipe be square although a very slight bevel around the outside is permissible and may be helpful in alignment. Conventional bevel joints, ordinarily at angles of 30° to 37.5°, are less satisfactory and are not required for this process. They may be used, but the bevel, if substantial, interferes with single pass welds.

The required gap or groove is cut into the pipe ends, or rather between them, by the high speed abrasive cutting disc 141.

Figure 2:
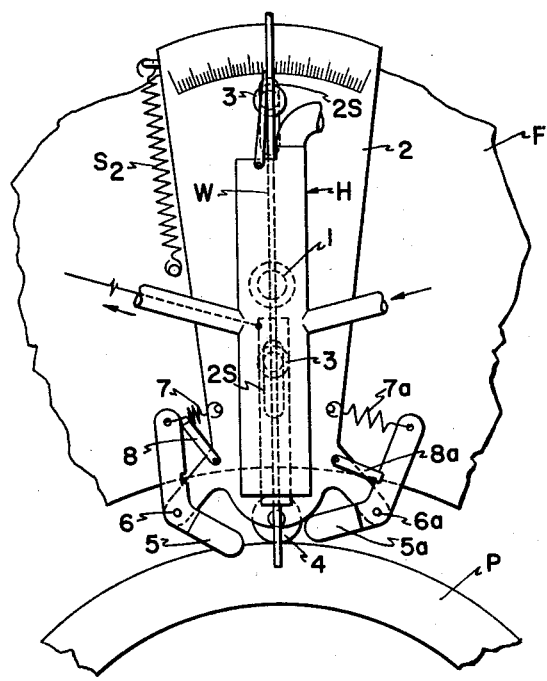
FIG. 2 is a detailed view of a welding head equipped for close position control, an important aspect of the process.

The welding head 151 is shown with the gas tube 205 and the inner contact tube 207 essentially similar to the apparatus of FIGS. 2 and 3. The head is formed so that it can be water cooled. A tube 212 brings a supply of gas into the head. The electric cable 213 supplies power to the welding arc. The welding head preferably is of the water cooled type and therefore is provided with an inlet 214 and an outlet 215 for cooling water which circulates around the contact tube and gas nozzle and keeps their temperature under control. Outlet 215 encloses the electrical cable 213. The water jacket around the welding head or tube 151 is also indicated at 217 in FIGURE 12, which figure will be described in fuller detail later. The cooling feature is well known in the art and need not be discussed further.

The CTWD distance is indicated at $d-1$ in FIGURE 7 and its magnitude is important in controlling the weld quality as has already been explained. A floating mounting is provided for the welding head. The welding head 151 and plate 155 which supports it are freely mounted on guide pins 218 for sliding in a generally radial direction toward and from the pipe. The plate 155 is normally impelled towards the pipe by a suitable spring 219 connected by a pin 220 to the movable ring or turret 133 and the welding head is held in properly spaced relationship with respect to the work surface by means of a gauging roller 221. The latter is mounted on an arm 222 suitably pivoted at 223 on plate or bracket 155 which supports the welding head. This plate or bracket 155 is provided with an arcuate slot 227 in which a follower may be adjustably clamped by a suitable bolt and wing nut 229. The arrangement is such that a constant CTWD is maintained while the welding head may be readily lifted away from contact or from welding proximity without disconnecting it from its electrical or hydraulic connections. Also, a limited lateral displacement along the pipe axis is permitted for reasons already explained.

Other features of the present invention are indicated in FIGURES 9, 10 and 11. In FIGURE 9 the space between the pipe ends has been cut through cleanly and the weld must fill a uniform gap from bottom to top. When this gap is carefully controlled in width and uniformity, an essentially smooth bottom and top surface may be produced. As the gap is filled, the molten weld wire and metal which is melted off the pipe ends by heat of the arc fuses with the pipe progressively as indicated at $W_1$. The heat of the arc is of greatest intensity around the end of the wire, about the middle of the pipe wall thickness. Adjoining pipe wall metal is fused here and flows inwardly and outwardly to melt the root edges of the pipe. This gives the characteristic weld cross-section of this process which is a distinctive and important feature of the present invention. The arc reaches its greatest intensity about mid-section, as shown in FIG. 11. See also FIGS. 12 and 16.

Where the spacing of smoothly finished pipe end sections can be accurately controlled and when they can be adequately clamped to preserve an accurate space between the butt ends, cutting is not necessary. It must be emphasized, however, that the width of the gap all around the pipe must be held within close tolerance limits, e.g., limits of 0.003" to 0.005" plus or minus, all the way around the pipe circumference or good welding cannot be accomplished by single pass operation. If maintenance of gap tolerance cannot be effected by simple clamping, then the cutting must precede the welding to obtain first quality single pass welds.

In FIGURE 10 the abutting pipe ends are grooved almost but not quite all the way through. A wheel or cutter having either a rounded edge or an essentially square edge may be used if desired. Care must be taken to cut very nearly the full distance through the pipe to secure the weld quality desired. The arrangement of FIGURE 10 helps to control the flow of weld metal in some cases.

Referring to FIG. 11, the flow of metal in a counter-clockwise welding traverse is shown. The wire W with its gas shield is fused and forms, together with metal melted from the pipe, the pool $P_1$ which tends to sag in a meniscus as indicated at $S_3$. However, the metal adjoining the weld extracts heat from the pool very rapidly as the welding arc moves on, causing shrinkage. The middle part of the pipe wall conducts less heat away than the portions near the inner and outer surfaces but the whole molten mass shrinks as it cools and solidifies. This shrinkage, plus the surface tension of the sagging liquid metal meniscus, tends to straighten up the inner surface, as indicated at $S_4$. Hence a substantially flush surface is formed inside the pipe. The continuous travel of the welding head, with synchronized wire feed to keep a continuous arc, and the narrow gap width combine to give an unusually well fused weld structure throughout the pipe wall thickness. The corner fusion at the root or inside surface of the weld is a particularly important feature. See FIG. 17.

Figure 13:
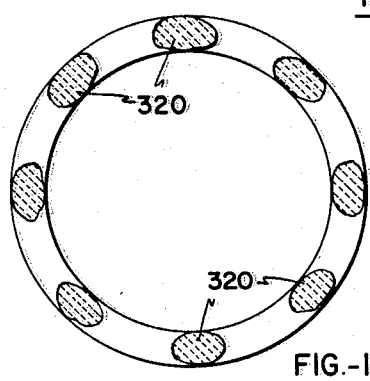
Figure 14:
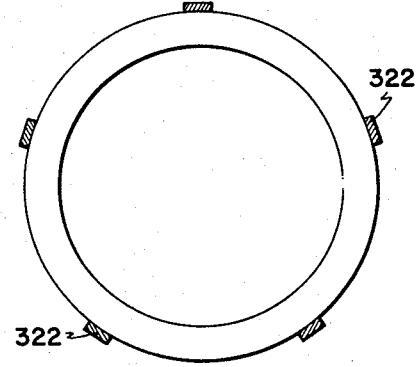

In practice, the welding operation may be carried out in several different ways. Under some conditions it is preferred first to tack the abutting pipe ends together as shown in FIGURE 13 at 320, with a weld between the abutting ends or by means of bridging bars 322 attached, as indicated in FIGURE 14. These hold the gap width constant despite forces set up by shrinkage.

The difficulty caused by contraction of the weld is also illustrated in FIGURE 12, which will now be described in detail. It will be remembered that the process is applicable at least in many of its aspects to flat plates welded in edge-to-edge abutting relationship as well as to pipes and other circular members. The arrangement of FIGURE 12 is shown applied to flat plates but is also applicable to pipes and other curved surfaces. Here three unit members of the apparatus, namely the cutter 141a, a spacing wheel 330, and the welding head 205A, are arranged on suitable supporting frame work not shown in detail but indicated generally at 329 to move simultaneously with respect to the work, along a joint between adjoining edges of plates indicated at 331. As the tools move to the right or, conversely, the work moves to the left, the cutting wheel 141a provides the proper spaced cut between the abutting edges. It is followed by spacing wheel 330 which has a sharply knurled or traction surface 335 formed on a concentric cylinder, both the spacer 330 and the traction surface cylinder elements being rigidly secured to a driving axle 337. The latter is positively rotated by suitable power means to carry the assembly to the right, FIG. 12, with respect to the work. The welding head 205A feeding the wire 209 and applying the electric arc to accomplish the welding follows behind. It will be understood that wire feed, electric supply, gas supply, and all other facilities needed are provided as in the modifications previously described.

The work, of course, is highly heated by the welding operation and cooling takes place rapidly causing shrinkage which, except for the spacing wheel 330, would apply severe strains on the cutting wheel. Spacing wheel 330 riding in the freshly cut joint prepared by wheel 141A holds the plates apart by a distance determined by its thickness, preferably the full width of the cutter 141A. Due to the fact that shrinkage near the welding head, for example at point $x$, is greater than further away at point $y$ the frictional force on the left or rising side of wheel 330 is greater than that on the leading side. The relative magnitude of these forces is indicated at least qualitatively by the arrows $f$–1 and $f$–2 respectively. The net result is that the driven spacing wheel pulls the knurled cylinder elements 335 into firm and driving contact with the work surface so that firm traction is provided for moving the welding assembly ahead to the right (or the work to the left) as the cutting and welding operations proceed.

Figure 15:
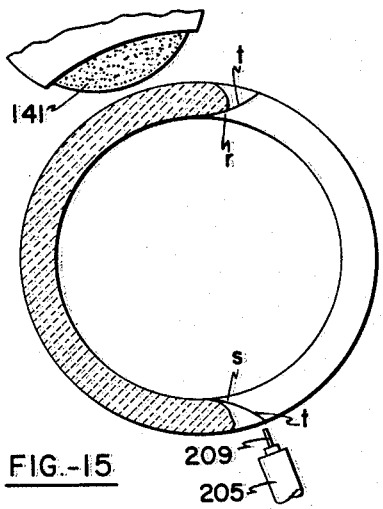

Referring now to FIGURES 13 to 16 in a typical operation the cutting wheel 141 is swung into contact with the joint at the top of the pipe and is rotated down one side through approximately 180° around the pipe. Assume for example that the joint has been cut around the left half of FIGURE 15 and has subsequently been welded. This was accomplished by first swinging the cutter 141 into operation and then counter-clockwise from top to bottom; secondly, the welder was brought into operation and rotated downwardly from the top in counter-clockwise direction to provide the shaded welded joint half way around the pipe as shown at the left of FIGURE 15.

Figure 16:
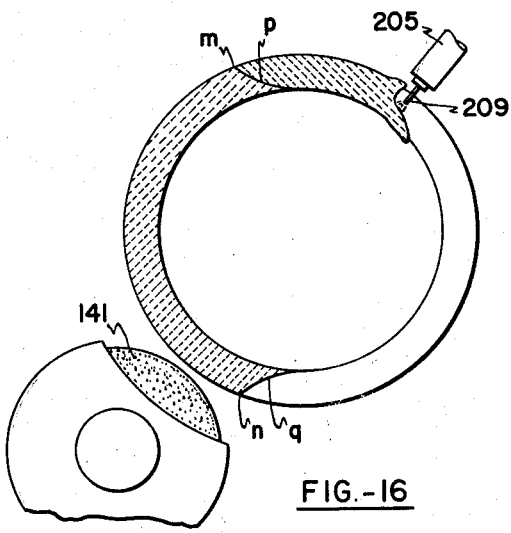

Referring now to FIGURE 16 the weld was completed by first bringing the cutter down in the approximate position of FIGURE 15 and swinging it clockwise from point $m$ to point $n$. This operation, it will be observed, rounded out an arcuate cut or ramp indicated at $p$ and ended by leaving a smooth arcuate ramp surface $q$ at the bottom. These ramp surfaces $p$ and $q$ were ideally suited for the second half of the weld since the weld metal flows in smoothly at the top and as the welder swings to the right or clockwise, the joint is filled in such a manner that gravity assists in obtaining smooth flow. At the bottom as the weld is finished gravity tends to flow the molten metal along the surface $q$ so as to form a flawless weld in the two operations. By contrast voids would tend to be formed as indicated at $r$ and $s$, FIGURE 15, if the end portions of the first half circumference weld were not cut out to put them in workable shape. This feature of forming a pipe weld in two operations each extending about half way around the circumference without flaws at the juncture of the two welds is an important aspect of the invention.

Reference has been made to the value of non-oxidizing gas. The welding head, as previously noted, is provided for shielding with a suitable gas such as carbon dioxide. It is possible under some circumstances to weld without the protecting gas but in most cases a much superior joint is obtained by the used of gas. The choice of gas varies with different steel and welding compositions. The advantages of carbon dioxide have already been noted.

The angle of inclination of the welding head has been mentioned. A crater is frequently formed at the beginning of the weld and this may be affected by the lead angle of the welding head. Hence, the latter must not be too great.

As noted above, carbon dioxide gas shielding gives a high penetrating arc. It was found that a somewhat wider joint gap such as $3/32$ inch (about 0.090″) gave too great penetration in steel pipe of 0.280 inch thickness so that the weld ran all the way through and inside the pipe. By narrowing the groove or gap slightly and holding it under firm control by adequate clamping, satisfactory welds were produced as indicated above.

The specific preferred process of using the combination apparatus involves the following steps:

(1) The pipe ends are brought into abutment and securely clamped.

(2) One side is cut through approximately a 180° arc from top to bottom.

(3) The welding head is brought to the top and the cut side is welded from top to bottom, the cutter being lifted to the idle position. The end of the first cut prepares ramp stops $t$, FIG. 15, for the weld and avoids a crater at the upper and lower ends.

The other half of the pipe is then cut from top to bottom clockwise and welding accomplished also clockwise from top to bottom. In the cutting operation the ramps $p$ and $q$ are cut at the start and the stop and the first weld is overlapped slightly to minimize craters or flaws.

In starting up the process, it is highly essential to keep all the variables under proper control. For example, the generator current voltage regulation must be stabilized and it is frequently desirable to bring the generator up to full operating temperature before starting to weld. The wire feed speed must be highly uniform, the welding movement of the arc must be of uniform velocity, and other variables must be kept under careful control. For example, variations of wire feed speed as low as 1 to 2% may seriously impair the quality of the welding operation.

Another specific example of satisfactory welding operation was obtained on a pipe of 0.280″ thickness. It was found that a groove width of 0.050 to 0.070″ was satisfactory but that for the wider groove, mixtures of $CO_2$ and argon were the preferred gas. For this type of weld, the gas rate should be between about 20 and 50 cubic feet per hour. A wire diameter of .030 to .0625 was found usable, the preferred range being .040 to .050. Standard welding wire compositions were satisfactory on ordinary steel pipe, whereas high grade pipes were more critical in their wire composition requirements. The preferred CTWD, it was found, was 0.35 to 0.50 inch. For 0.40″ wire, wire-feed speeds of 500 to 650 inches per minute are preferable, whereas 0.48″ wire should run about 20% less.

FIGURE 17 shows an example of the desired cross-section of a very good weld. Even with the fusion of the adjoining pipe metal, the whole weld still has a depth to width ratio of about two to one. Such configuration not only minimizes use of welding wire but gives strong smooth joints of excellent quality.

In contrast to other processes, the present process welds at a single pass to give an excellent weld cross section. Sections taken from actual welds show the characteristic shape for the weld itself and the heat treated area adjoining as FIG. 17 shows. High speed motion pictures which have been taken show that the heat of the arc apparently reaches its greatest intensity about the middle of the wall thickness, where the consumable electrode wire burns off. Wall fusion on both sides, plus the molten wire provides the superheated molten pool of weld metal which the force of the arc pushes inwardly as well as laterally. This superheated weld metal fuses back the inner wall or root edges to give the weld cross-section a characteristic flared shape at the inner wall. Ideally, a generally similar shape is achieved at the outer wall surface, but the root weld is of greater practical importance. The heat of the weld also heat-treats the metal of the pipe wall to give the generally rectangular penumbra effect adjoining the actual weld on both sides. This highly desirable weld formation is a superior feature.

It will be understood that many variations may be made in dimensions, rates, and other factors indicated above so long as their proper interrelationships and combinations are observed. It is intended to cover these and other obvious alternatives as broadly as possible, within the limits of the prior art, by the following claims.

What is claimed is:

1. An improved process capable of making butt joint welds out of the flat position between adjoining portions of metal shapes which comprises bringing said portions into near-abutting relationship, providing a narrow spacing and complete gap of highly uniform width and of depth to width ratio between about 3 to 1 and 7 to 1 between said portions, and substantially continuously welding by traversing a welding unit with respect to an adjacent surface of said shapes and at a substantially uniform speed, and simultaneously feeding welding material in the form of a consumable electrode into said gap at a carefully controlled and substantially uniform rate about 5 to 20 times said traversing speed while maintaining a substantially continuous arc within said gap to fill said groove substantially uniformly and thereby provide a weld of uniform quality.

2. The improved process of forming girth welds on hollow shapes such as pipe or tubing, which comprises bringing sections of said shapes into substantially end-abutting position, establishing a gap of substantially uniform width and having a depth to width ratio between about 3 to 1 and 7 to 1 between the abutting ends, feeding into said gap a welding material of a small cross section at a substantially uniform rate with respect to a progressive welding rate, and maintaining an arc within said gap while progressively welding around a substantial part of said sections by a rapid and continuous relative movement between said shapes and said arc, the rate of said movement being related substantially directly to said welding material feed rate, whereby a uniform and substantial weldment is produced in a single pass operation.

3. Apparatus for welding the abutting edge portions of metal shapes, comprising carriage means adapted to move relatively along the line of weld with respect to said shapes, means for accurately and uniformly spacing said edge portions so as to provide a relatively narrow and deep gap between them with a depth to width ratio of about 3 to 1 to 7 to 1, a welding head for supplying a welding arc, said head being supported by said carriage for relative movement with respect to the metal shapes and along the weld line, and means for supplying welding material to said welding head and into said gap at a uniform rate of feed, whereby a substantial weldment is formed at a single pass.

4. Apparatus according to claim 3 wherein the carriage also is provided with means for holding the welding head at a predetermined spacing distance from the line of weld regardless of inequalities in thickness or surface conditions of said metal shapes.

5. Apparatus according to claim 3 wherein a gap width control device is carried by said carriage between the welding head and the spacing means so as to hold the gap open and of uniform width during the welding operation in spite of strong contractive forces tending to close said gap.

6. The method of forming girth welds around pipes and similar hollow circular section units of metal, which comprises bringing sections of said units substantially into end-to-end abutting relationship, clamping said sections in said abutting relationship, rapidly and continuously cutting a narrow groove of substantially uniform width between said sections through a substantial part of their circumference, filling a substantial part of said groove to a substantially uniform level with weld metal by a single pass substantially continuous welding operation to partially complete the weld joint, thereafter cutting a groove throughout a further substantial part of said circumference, and similarly filling said further cut groove with weld metal to further complete the weld joint.

7. Method according to claim 6 wherein the last mentioned cutting operation removes a small portion of the first mentioned weld metal so as to form a ramp which can be more readily and effectively welded than the normal weld metal terminus.

8. The method of welding pipe lines and the like which comprises bringing the ends of pipe sections into substantial alignment and abutment, clamping such sections in said alignment and abutment, mechanically forming between said sections a gap opening of uniform width from substantially the top to substantially the bottom of the pipe on one side of its axis, welding said gap by forming a substantially continuous arc and feeding a consumable electrode thereinto to form a joint substantially throughout the length of said gap at a single pass operation, thereafter forming an extension of the original gap on the other side of the pipe to complete the circumferential gap formation and finally welding the last mentioned gap extension to complete the weld joint.

9. Welding apparatus comprising a movable frame, a gap forming device comprising a high speed cutter mounted on said frame in a manner for positioning selectively in or out of operative position with respect to a joint to be gapped and welded, a welding head also mounted on said frame for variable positioning in two dimensions with respect to said joint, a spacing wheel fixedly mounted on a driven axle, and a traction-surfaced roller coaxially mounted with said spacing wheel on said axle whereby rotation of the spacing wheel is accompanied by rotation of said roller to impart traction to said frame and move the whole apparatus relatively with respect to and along said joint.

10. Apparatus according to claim 9 wherein the apparatus is arranged to cut and weld linear joints.

11. Apparatus according to claim 9 wherein the apparatus is arranged to cut circumferentially and to form girth welds about a hollow cylindrical piece of work.

12. In a method of machine welding ferrous metal pipe the improvement which comprises bringing pipe sections into substantially abutting end-to-end relationship, forming a gap of width between 0.020 and 0.10 inch between the ends to form parallel spaced facing end portions perpendicular to the pipe axis and with substantial gap width uniformity, traversing a welding head relatively with respect to and along said gap and circumferentially of said pipe at a travel rate of at least 30 inches per minute, feeding consumable welding electrode material into said gap in the form of wire at a rate that is about 5 to 20 times the traversing rate and substantially uniform, and maintaining a substantially continuous welding arc within said gap through the welding of a substantial part of the pipe circumference.

13. Method according to claim 12 wherein the gap is formed by accurate alignment and rigid clamping of the pipe sections.

14. Method according to claim 12 wherein the gap is formed by accurately cutting it between pipe sections which have been brought into closer proximity than the final gap width.

15. Method according to claim 14 wherein the pipe end elements are first rigidly secured together by tack welding prior to cutting.

16. Method according to claim 12 wherein the gap is formed part way around the circumference and that portion is welded before completing the gap around the remainder of the circumference.

17. Method according to claim 12 wherein the welding is performed in at least two steps with the welding head traveling in different directions in two of the steps.

18. Method according to claim 12 wherein the voltage of electric current across the arc is maintained constant within plus or minus 0.3 volt during a continuous welding traverse for any desired setting within the general voltage range of 20 to 35 volts.

19. Method according to claim 12 wherein the welding operation is performed in at least two steps opposite in direction of traverse and an end of the first weld is cut to form a ramp for the second weld.

20. A method of forming butt weld joints between metal sections of thickness of the order of 0.1 to 0.5 inch thickness, which comprises establishing a gap of ⅛ to ½ the wall thickness, and continuously feeding a consumable welding electrode at a controlled and substantially uniform rate into said gap while continuously traversing a welding arc relatively with respect to and along said gap at a substantially uniform rate of relative traverse, said arc being substantially concentrated within said gap and near the middle of the wall thickness.

21. Method according to claim 20 wherein a substantially complete weld is accomplished at a single pass.

22. A process for welding between abutted metal shapes which comprises arranging a very narrow gap of substantially uniform width between said shapes, feeding a slender wire electrode of width less than said gap but not substantially less than half such width well into said gap while applying an electromotive force to said electrode to establish and maintain an arc confined substantially continuously within said gap, and relatively moving said arc along said gap, while simultaneously feeding the wire electrode, to form a weldment of relatively thick mid-section in a single pass.

23. A process for rapidly forming a precision welded joint between adjacent ends of sections of metal tubing, which comprises establishing a gap of highly uniform width between said ends, firmly maintaining the gap while rapidly traversing relatively to said joint a welding arc around said joint at a rate of at least about 30 inches per minute, continuously feeding a wire electrode into said gap and said arc at a rate of about 5 to 20 times said traversing rate, whereby an arc is maintained essentially continuously and is confined substantially within said gap and there is formed a uniform weldment of substantial depth, penetration and strength at a single pass.

24. Process according to claim 23 wherein the weld is substantially completely formed at said single pass to a level substantially even with both the inner and outer surfaces of the tubing.

25. Apparatus for forming girth welds in pipelines comprising, in combination, a primary frame adapted to be secured to and at least partially surround said pipeline, an independent orbital frame supported by said primary frame and adapted to move relatively around said pipeline, means for driving said independent frame in its orbital movement, a welding head carried by said independent frame, means also carried by said independent frame for feeding a slender wire electrode to said welding head during orbital movement of both said head and feeding means, rotary cutting means also mounted for orbital movement about said pipeline to cut an electrode receiving groove of accurate alignment and accurate dimensions ahead of the welding head to receive said electrode, and means for constantly maintaining relative alignment of said cutter and said welding head to insure reception of the electrode substantially centrally within a cut groove.

References Cited in the file of this patent

UNITED STATES PATENTS

| | | |
|---|---|---|
| 1,531,824 | Smith | Mar. 31, 1925 |
| 1,599,927 | Stresau | Sept. 14, 1926 |
| 1,761,167 | Anderson | June 3, 1930 |
| 1,867,375 | Priebe | July 12, 1932 |
| 1,872,114 | Burnish | Aug. 16, 1932 |
| 1,997,969 | Hopkins | Apr. 16, 1935 |
| 2,079,265 | Trainer | May 4, 1937 |
| 2,258,913 | Stone | Oct. 14, 1941 |
| 2,642,965 | Danhier | June 23, 1953 |
| 2,885,533 | Ter Berg | May 5, 1959 |
| 2,892,070 | Kitrell | June 23, 1959 |
| 2,894,111 | McNutt | July 7, 1959 |
| 2,906,851 | Kitrell | Sept. 29, 1959 |
| 2,906,852 | Cornell et al. | Sept. 29, 1959 |
| 2,907,866 | Yenni | Oct. 6, 1959 |
| 2,960,597 | Bruno et al. | Nov. 15, 1960 |
| 2,966,576 | Nowotny | Dec. 27, 1960 |